US010229395B2

(12) United States Patent
Smith et al.

(10) Patent No.: US 10,229,395 B2
(45) Date of Patent: Mar. 12, 2019

(54) PREDICTIVE DETERMINATION AND RESOLUTION OF A VALUE OF INDICIA LOCATED IN A NEGOTIABLE INSTRUMENT ELECTRONIC IMAGE

(71) Applicant: BANK OF AMERICA CORPORATION, Charlotte, NC (US)

(72) Inventors: Michael Gerald Smith, Charlotte, NC (US); James F. Barrett, II, Morristown, NJ (US); Andrew Patrick Bastnagel, Charlotte, NC (US); Joshua Allen Beaudry, Jersey City, NJ (US); Eric Dryer, Charlotte, NC (US); Shawn Cart Gunsolley, Charlotte, NC (US); Marshall Bright Thompson, Charlotte, NC (US); Michael Matthew Wisser, Tega Cay, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 627 days.

(21) Appl. No.: 14/750,393

(22) Filed: Jun. 25, 2015

(65) Prior Publication Data

US 2016/0379185 A1  Dec. 29, 2016

(51) Int. Cl.
*G06Q 40/00* (2012.01)
*G06Q 20/04* (2012.01)
*G06F 17/30* (2006.01)

(52) U.S. Cl.
CPC ....... *G06Q 20/042* (2013.01); *G06F 17/3028* (2013.01)

(58) Field of Classification Search
CPC ... G06Q 40/00; G06Q 20/042; G06F 17/3028
(Continued)

(56) References Cited

U.S. PATENT DOCUMENTS

| 3,737,628 A | 6/1973 | Azure, Jr. |
| 4,417,136 A | 11/1983 | Rushby et al. |

(Continued)

FOREIGN PATENT DOCUMENTS

| EP | 671696 | 9/1995 |
| JP | 9282387 | 10/1997 |

(Continued)

OTHER PUBLICATIONS

Mitek Introduces PADsafe Toolkit to Detect Preauthorized Draft Fraud; New Product Helps Banks Prevent Losses Due to Fraudulent Preauthorized Drafts, PR Newswire Feb. 10, 2004: NA.*

(Continued)

*Primary Examiner* — Lalita M Hamilton
(74) *Attorney, Agent, or Firm* — Michael A. Springs; Moore & Van Allen PLLC; Nicholas C. Russell

(57) ABSTRACT

Embodiments of the invention include systems, methods, and computer-program products for predictive determination and resolution of an exception located on a negotiable instrument. The exception may be an indicia that includes data related to the payor, payment accounts, or payee. An indicia may not be identified successfully and thus be queued for exception processing. The exceptions may include one or more irregularities such as bad micro line reads, outdated check stock, or misrepresentative indicia points on a negotiable instrument that may result in a failure to match the check to an account for processing. Upon identifying an exception, the system retrieves historical transaction data associated with the resolved indicia. Subsequently, utilizing the resolved indicia, the system may determine a value for the exception identified based on the retrieved historical transaction data. Finally, the determined value may be stored with the negotiable instrument to complete the payment reconciliation process.

20 Claims, 8 Drawing Sheets

(58) Field of Classification Search
USPC .................................................. 705/35, 45
See application file for complete search history.

(56) References Cited

U.S. PATENT DOCUMENTS

| | | | |
|---|---|---|---|
| 4,523,330 A | 6/1985 | Cain | |
| 4,555,617 A | 11/1985 | Brooks et al. | |
| 4,947,321 A | 8/1990 | Spence et al. | |
| 5,007,100 A | 4/1991 | D'Aoust et al. | |
| 5,077,805 A | 12/1991 | Tan | |
| 5,097,517 A | 3/1992 | Holt | |
| 5,121,945 A | 6/1992 | Thomson et al. | |
| 5,159,548 A | 10/1992 | Caslavka | |
| 5,167,013 A | 11/1992 | Hube et al. | |
| 5,198,975 A | 3/1993 | Baker et al. | |
| 5,257,328 A | 10/1993 | Shimizu | |
| 5,326,104 A | 7/1994 | Pease et al. | |
| 5,433,483 A | 7/1995 | Yu | |
| 5,550,932 A | 8/1996 | Blaylock et al. | |
| 5,594,226 A | 1/1997 | Steger | |
| 5,678,046 A | 10/1997 | Cahill et al. | |
| 5,679,940 A | 10/1997 | Templeton et al. | |
| 5,740,271 A | 4/1998 | Kunkler et al. | |
| 5,754,673 A | 5/1998 | Brooks et al. | |
| 5,781,654 A | 7/1998 | Carney | |
| 5,842,577 A | 12/1998 | Stevens et al. | |
| 5,895,455 A | 4/1999 | Bellinger et al. | |
| 5,917,965 A | 6/1999 | Cahill et al. | |
| 5,926,392 A | 7/1999 | York et al. | |
| 5,940,844 A | 8/1999 | Cahill et al. | |
| 5,963,659 A | 10/1999 | Cahill et al. | |
| 6,073,121 A | 6/2000 | Ramzy | |
| 6,115,494 A | 9/2000 | Sonoda et al. | |
| 6,128,401 A | 10/2000 | Suzuki et al. | |
| 6,129,273 A | 10/2000 | Shah | |
| 6,181,837 B1 | 1/2001 | Cahill et al. | |
| 6,188,787 B1 | 2/2001 | Ohmae et al. | |
| 6,351,553 B1 | 2/2002 | Hayosh | |
| 6,384,844 B1 | 5/2002 | Stewart et al. | |
| 6,574,377 B1 | 6/2003 | Cahill et al. | |
| 6,600,823 B1 | 7/2003 | Hayosh | |
| 6,863,214 B2 | 3/2005 | Garner et al. | |
| 6,959,326 B1 | 10/2005 | Day et al. | |
| 7,004,382 B2 | 2/2006 | Sandru | |
| 7,090,131 B2 | 8/2006 | Natsuno | |
| 7,092,561 B2 | 8/2006 | Downs, Jr. | |
| 7,124,113 B1 | 10/2006 | Fairclough et al. | |
| 7,165,723 B2 | 1/2007 | McClamery et al. | |
| 7,349,884 B1 | 3/2008 | Odom et al. | |
| RE40,220 E | 4/2008 | Nichols et al. | |
| 7,379,978 B2 | 5/2008 | Anderson et al. | |
| 7,389,914 B1 | 6/2008 | Enright et al. | |
| 7,391,934 B2 | 6/2008 | Goodall et al. | |
| 7,461,775 B2 | 12/2008 | Swift et al. | |
| 7,471,818 B1 | 12/2008 | Price et al. | |
| 7,494,052 B1 | 2/2009 | Carpenter et al. | |
| 7,606,408 B2 | 10/2009 | Takiguchi | |
| 7,680,317 B2 | 3/2010 | Adelberg et al. | |
| 7,680,318 B2 | 3/2010 | Agrawal et al. | |
| 7,689,025 B2 | 3/2010 | Takiguchi | |
| 7,693,305 B2 | 4/2010 | Emerson et al. | |
| 7,697,728 B2 | 4/2010 | Emerson et al. | |
| 7,702,588 B2 | 4/2010 | Gilder et al. | |
| 7,706,275 B2 | 4/2010 | Archer et al. | |
| 7,735,721 B1 | 6/2010 | Ma et al. | |
| 7,752,286 B2 | 7/2010 | Anderson | |
| 7,757,938 B2 | 7/2010 | Richardson et al. | |
| 7,769,772 B2 | 8/2010 | Weyl et al. | |
| 7,856,403 B2 | 12/2010 | Venturo et al. | |
| 7,950,698 B2 | 5/2011 | Popadic et al. | |
| 7,962,412 B2 | 6/2011 | Omura et al. | |
| 7,970,706 B2* | 6/2011 | Keene | G06Q 20/042 |
| | | | 705/35 |
| 8,045,818 B2 | 10/2011 | Sato et al. | |
| 8,052,040 B2 | 11/2011 | Stover | |
| 8,155,425 B1 | 4/2012 | Mandel | |
| 8,162,125 B1 | 4/2012 | Csulits et al. | |
| 8,229,203 B2 | 7/2012 | Faulkner et al. | |
| 8,358,826 B1 | 1/2013 | Medina et al. | |
| 8,437,529 B1 | 5/2013 | Mennie et al. | |
| 8,438,427 B2 | 5/2013 | Beck et al. | |
| 8,467,591 B1 | 6/2013 | Csulits | |
| 8,516,301 B2 | 8/2013 | Beck et al. | |
| 8,606,705 B2 | 12/2013 | Zanzot et al. | |
| 8,655,047 B1 | 2/2014 | Walker et al. | |
| 8,712,143 B2 | 4/2014 | Tran | |
| 8,864,029 B2 | 10/2014 | McGlamery et al. | |
| 9,176,760 B2 | 11/2015 | Halambi et al. | |
| 9,317,484 B1 | 4/2016 | Ho | |
| 9,436,623 B2 | 9/2016 | Wertheimer et al. | |
| 9,779,392 B1* | 10/2017 | Prasad | G06Q 20/0425 |
| 2001/0006556 A1 | 7/2001 | Graves et al. | |
| 2001/0051921 A1 | 12/2001 | Garner, IV et al. | |
| 2002/0000995 A1 | 1/2002 | Sawada et al. | |
| 2002/0023053 A1 | 2/2002 | Szoc et al. | |
| 2002/0037097 A1 | 3/2002 | Hoyos et al. | |
| 2002/0051562 A1 | 5/2002 | Sheppard et al. | |
| 2002/0067846 A1 | 6/2002 | Foley | |
| 2002/0104782 A1 | 8/2002 | DeWitt et al. | |
| 2002/0169861 A1 | 11/2002 | Chang et al. | |
| 2003/0140007 A1 | 7/2003 | Kramer et al. | |
| 2003/0208440 A1 | 11/2003 | Harada et al. | |
| 2003/0236877 A1 | 12/2003 | Allan | |
| 2004/0076320 A1 | 4/2004 | Downs | |
| 2004/0131242 A1 | 7/2004 | Klevtsov | |
| 2004/0133516 A1 | 7/2004 | Buchanan et al. | |
| 2004/0215560 A1 | 10/2004 | Amalraj et al. | |
| 2004/0217170 A1 | 11/2004 | Takiguchi et al. | |
| 2005/0010524 A1 | 1/2005 | Gutbrod et al. | |
| 2005/0094861 A1 | 5/2005 | Prakash et al. | |
| 2005/0097019 A1 | 5/2005 | Jacobs | |
| 2005/0139670 A1 | 6/2005 | McGlamery et al. | |
| 2005/0139671 A1 | 6/2005 | McGlamery et al. | |
| 2005/0144189 A1 | 6/2005 | Edwards et al. | |
| 2005/0160039 A1 | 7/2005 | Garner et al. | |
| 2005/0189272 A1 | 9/2005 | DiBiaso et al. | |
| 2005/0281449 A1 | 12/2005 | Takiguchi | |
| 2005/0281450 A1 | 12/2005 | Richardson | |
| 2006/0031122 A1 | 2/2006 | Lane et al. | |
| 2006/0041506 A1 | 2/2006 | Mason et al. | |
| 2006/0088199 A1 | 4/2006 | Shizuka et al. | |
| 2006/0095364 A1 | 5/2006 | Hamilton et al. | |
| 2006/0106717 A1* | 5/2006 | Randle | G06Q 20/04 |
| | | | 705/45 |
| 2006/0144937 A1 | 7/2006 | Heilper et al. | |
| 2006/0184441 A1 | 8/2006 | Haschka et al. | |
| 2006/0186194 A1 | 8/2006 | Richardson et al. | |
| 2006/0191998 A1 | 8/2006 | Mueller et al. | |
| 2006/0219773 A1 | 10/2006 | Richardson | |
| 2007/0019855 A1 | 1/2007 | Marlett | |
| 2007/0045930 A1 | 3/2007 | Hayduchok et al. | |
| 2007/0061260 A1 | 3/2007 | deGroeve et al. | |
| 2007/0064991 A1 | 3/2007 | Douglas et al. | |
| 2007/0156438 A1 | 7/2007 | Popadic et al. | |
| 2007/0162387 A1 | 7/2007 | Cataline et al. | |
| 2007/0172109 A1 | 7/2007 | Agrawal et al. | |
| 2007/0198437 A1 | 8/2007 | Eisner et al. | |
| 2007/0215691 A1 | 9/2007 | Swift et al. | |
| 2007/0217669 A1 | 9/2007 | Swifft et al. | |
| 2007/0267477 A1 | 11/2007 | Schott et al. | |
| 2007/0288382 A1 | 12/2007 | Narayanan et al. | |
| 2008/0015985 A1 | 1/2008 | Abhari et al. | |
| 2008/0040249 A1* | 2/2008 | Re | G06Q 40/00 |
| | | | 705/35 |
| 2008/0063278 A1 | 3/2008 | Vincent et al. | |
| 2008/0086420 A1 | 4/2008 | Gilder et al. | |
| 2008/0135610 A1 | 6/2008 | Roh | |
| 2008/0137939 A1 | 6/2008 | Wang et al. | |
| 2008/0140552 A1 | 6/2008 | Blaikie | |
| 2008/0168439 A1 | 7/2008 | Anderson et al. | |
| 2008/0195537 A1 | 8/2008 | Schulz | |
| 2008/0232648 A1 | 9/2008 | Emerson et al. | |
| 2008/0262950 A1* | 10/2008 | Christensen | G06Q 20/042 |
| | | | 705/30 |

(56) References Cited

U.S. PATENT DOCUMENTS

| | | | |
|---|---|---|---|
| 2008/0279455 | A1 | 11/2008 | Wall |
| 2008/0284799 | A1 | 11/2008 | Hollemans et al. |
| 2008/0290181 | A1 | 11/2008 | Dimitri et al. |
| 2008/0294554 | A1 | 11/2008 | Neotytides et al. |
| 2009/0018960 | A1 | 1/2009 | Gawne |
| 2009/0034848 | A1 | 2/2009 | Sakamoto et al. |
| 2009/0034849 | A1 | 2/2009 | Grosvenor |
| 2009/0037339 | A1 | 2/2009 | Ancell et al. |
| 2009/0114715 | A1 | 5/2009 | Mueller et al. |
| 2009/0164372 | A1 | 6/2009 | Dell et al. |
| 2009/0236413 | A1 | 9/2009 | Mueller et al. |
| 2009/0324053 | A1 | 12/2009 | Ross et al. |
| 2010/0036775 | A1 | 2/2010 | Edens |
| 2010/0122216 | A1 | 5/2010 | Song et al. |
| 2010/0211499 | A1 | 8/2010 | Zanzot et al. |
| 2010/0280859 | A1 | 11/2010 | Frederick, II |
| 2010/0280871 | A1 | 11/2010 | Goertz et al. |
| 2011/0091092 | A1 | 4/2011 | Nepomniachtchi et al. |
| 2011/0206266 | A1 | 8/2011 | Faulkner et al. |
| 2011/0219208 | A1 | 9/2011 | Asaad et al. |
| 2011/0251956 | A1 | 10/2011 | Cantley et al. |
| 2011/0264572 | A1 | 10/2011 | Cucinotta |
| 2011/0280450 | A1 | 11/2011 | Nepomniachtchi et al. |
| 2012/0140624 | A1 | 6/2012 | Denman et al. |
| 2012/0189186 | A1 | 7/2012 | Csulits et al. |
| 2013/0056531 | A1 | 3/2013 | Sato et al. |
| 2013/0067069 | A1 | 3/2013 | Allen et al. |
| 2013/0067074 | A1 | 3/2013 | Allen et al. |
| 2013/0124414 | A1 | 5/2013 | Roach et al. |
| 2013/0185200 | A1 | 7/2013 | Neinast et al. |
| 2013/0229911 | A1 | 9/2013 | Nagata et al. |
| 2013/0239185 | A1* | 9/2013 | Orttung .................... G06F 21/40 726/5 |
| 2013/0243303 | A1 | 9/2013 | Imae et al. |
| 2013/0287284 | A1 | 10/2013 | Nepomniachtchi et al. |
| 2013/0325706 | A1 | 12/2013 | Wilson et al. |
| 2014/0052697 | A1 | 2/2014 | Williams et al. |
| 2014/0112282 | A1 | 4/2014 | Wijting et al. |
| 2014/0153787 | A1 | 6/2014 | Schmidtler et al. |
| 2014/0164194 | A1 | 6/2014 | Landry, Jr. et al. |
| 2014/0195967 | A1 | 7/2014 | Abe et al. |
| 2014/0233835 | A1 | 8/2014 | Sandoz et al. |
| 2014/0233837 | A1 | 8/2014 | Sandoz et al. |
| 2014/0359472 | A1 | 12/2014 | Lefor |
| 2015/0012442 | A1* | 1/2015 | Ceribelli ............ G06Q 20/1085 705/45 |
| 2015/0378539 | A1 | 12/2015 | Nickolaevich et al. |
| 2016/0182328 | A1 | 6/2016 | Bhasin et al. |

FOREIGN PATENT DOCUMENTS

| | | |
|---|---|---|
| WO | WO 2005066880 | 7/2005 |
| WO | WO 2005081917 | 9/2005 |

OTHER PUBLICATIONS

European Search Report completed May 27, 2010 for European Application No. EP 10 25 0246.

International Search Report and the Written Opinion of the International Searching Authority dated Apr. 12, 2010 for International Application No. PCT/US2010/24123 Apr. 2, 2010 for International Application No. PCT/US 10/24123.

International Search Report and the Written Opinion of the International Searching Authority dated Apr. 19, 2010 for International Application No. PCT/US2010/24113 Apr. 12, 2010 for International Application No. PCT/US 10/24113.

Extended European Search Report dated Jun. 1, 2010 for European Application No. EP 10 25 0245.

Instituto Mexican de la Propiedad Industrial. Mexico Office Action dated May 29, 2012. Mexico Application No. MX/a/2010/001718. Name of Applicant: Bank of America Corporation. Spanish Language. 3 pages.

European Patent Office. European Application No. 10 250 245.7-1955. European Office Action dated May 6, 2013. Name of Applicant Bank of America Corporation. 7 pages.

Instituto Mexican de la Propiedad Industrial. Mexico Office Action dated Apr. 8, 2013. Mexico Application No. MX/a/2010/001717. Name of Applicant: Bank of America Corporation. Spanish Language. 3 pages.

Instituto Mexicano de la Propiedad Industrial. Mexico Office Action dated Apr. 8, 2013. Mexico Application No. MX/a/2010/001717. Name of Applicant: Bank of America Corporation. English Language Summary. 1 page.

Instituto Mexicano de la Propiedad Industrial. Mexico Office Action dated May 29, 2012. Mexico Application No. MX/a/2010/001718. Name of Applicant: Bank of America Corporation. English Language Summary. 1 page.

Examination Report for related European Patent Application No. 10250246.5 dated Oct. 22, 2013.

International Preliminary Report on Patentability dated Aug. 25, 2011 for PCT/US2010/024113.

International Preliminary Report on Patentability dated Aug. 25, 2011 for PCT/US2010/024123.

"Instant verification of check quality and usability," Parascript, LLC, Longmont, Colorado, retrieved from the World Wide Web on Jul. 17, 2012, 2 pages.

"Check 21: Harnessing a Billion Points of Light," Mercator Advisory Group, May 24, 2004, Maynard, Massachusetts, retrieved from the Internet on Oct. 3, 2015; 3 pages.

"Check Encoders," Starex Financial Systems—Banking Equipment. com, Northridge, California, retrieved from the World Wide Web on Jul. 17, 2012, 3 pages.

"Let's face it—it's hard to keep up," Silver Bullet Technology, Inc., Pensacola, Florida, retrieved from the World Wide Web on Jul. 17, 2012, 2 pages.

Klein, Bob, et al., "Image Quality and Usability Assurance: Phase 1 Project," The Financial Services Technology Consortium (Available from BITS—The Financial Services Roundtable, Washington, D.C.), Aug. 23, 2004, 68 pages.

"Electronic check processing solutions: Choosing the right option for retail payments," First Data, 2008, Atlanta, Georgia; 16 pages.

"Reduce exception item processing costs: New technology paves the way to new saving," Cummins Allison Corporation, Mt. Prospect, Illinois, retrieved from the Internet on Oct. 3, 2015, 6 pages.

"Check 21 and Image Security," The Standard Register Company, Dec. 8, 2003, Wayne, New Jersey, 9 pages.

"X9LIB Software Development Toolkit," All My Papers, Aug. 8, 2012, Saratoga, California, 3 pages.

"MICR V Encoder M-570D," Progressive Business Systems, Inc., 2011, Auburn, Georgia, 2 pages.

"Correcting the Codeline (MICR line)," Financial Management Service—A Bureau of the United States Department of the Treasury, Washington, D.C, retrieved from the World Wide Web on Jul. 18, 2012, 4 pages.

"Vision IP:Check21—Delivering an end-to-end, image-enabled electronic payments environment," Metavante Corporation, 2008, Milwaukee, Wisconsin, 5 pages.

Higgins, R., "Ramifications of MICR Mismatch in Check Image Exchange", All My Papers Publication, Jan. 2008, 16 pages.

Malchar, R., "The Value of MICR for the Remote Check Depositor", Panini Advanced Solutions for Document Processing, 2008, 24 pages.

Higgins, R., "Small Check Scanner MICR Read Performance Benchmark Study", Feb. 27, 2006, 7 pages.

Canadian Office Action dated Oct. 30, 2012 for Application No. 2,546,849.

International Preliminary Report on Patentability for International Application No. PCT/US2004/043832 dated Jul. 3, 2006.

International Search Report for International Application No. PCT/US2004/043832 dated May 19, 2005.

Written Opinion for International Application No. PCT/US2004/043832 received May 17, 2005.

(56) References Cited

OTHER PUBLICATIONS

"A New Methodology for Gray-Scale Character Segmentation and Recognition", Lee, et al., IEEE Transactions on Pattern Analysis and Machine Intelligence, vol. 18, No. 10, Oct. 1996.

* cited by examiner

PREDICTIVE DETERMINATION AND RESOLUTION OF A VALUE OF INDICIA LOCATED IN A NEGOTIABLE INSTRUMENT ELECTRONIC IMAGE

BACKGROUND

Entities typically receive large volumes of documents from vendors, customers, or employees on any given day. Each document, especially if it is a financial document, is typically reconciled with a financial account associated with the financial document. In this way, specific characteristics of a document are matched to a corresponding account.

However, sometimes no match can be made between the document and a corresponding account. As such, when an exception occurs, an individual may have to look to other characteristics of the document for reconciliation purposes.

BRIEF SUMMARY

Embodiments of the present invention address the above needs and/or achieve other advantages by providing apparatuses (e.g., a system, computer program product and/or other devices) and methods for predictive determination and resolution of an indicia located on a negotiable instrument. The indicia includes data related to the payor, payment accounts, or payee. An indicia may not be identified successfully and thus be queued for exception processing. The exceptions may include one or more irregularities such as bad micro line reads, outdated check stock, or misrepresentative indicia points on a negotiable instrument that may result in a failure to match the check to an account for processing. Upon identifying an exception, the system retrieves historical transaction data associated with the resolved indicia. Subsequently, utilizing the resolved indicia, the system may determine a value for the exception identified based on the retrieved historical transaction data. Finally, the determined value may be stored with the negotiable instrument to complete the payment reconciliation process.

Payment instrument or negotiable instrument exception processing allows automated decisions for exception processing to systematically resolve exceptions. The exceptions may include one or more irregularities such as bad micro line reads, outdated check stock, or misrepresentative checks that may result in a failure to match the check to an associated account for processing. In this way, indicia that have been pulled from an image of the negotiable instrument may be un-readable or not able to be matched to an account for processing.

In some embodiments, the system may receive images of negotiable instruments from one or more sources. The negotiable instruments may be received from within an entity, from other financial institutions, or the like. In some embodiments, the documents include images of checks or other financial documents captured by an account holder or other entity. From the received negotiable instruments or payment instruments, the system may detect data from the financial record image based on one or more indicia on the negotiable instrument. This information may from an indicia and be any written or printed information on the front or back of the negotiable instrument. The negotiable instruments may include a myriad of financial documents, including but not limited to checks, lease documents, mortgage documents, deposit slips, payment coupons, receipts, general ledger tickets, or the like.

In the present invention, once the negotiable instrument is received, the invention may extract and process indicia associated with the negotiable instrument. The indicia associated with the negotiable instrument may include data related to the payor, related to the payor account, or related to the payee. In some embodiments, the system may extract data, in the form of metadata from the negotiable instrument. The negotiable instrument, which may be a check or the like, may be utilized to extract and/or collect the information associated with the negotiable instrument into metadata instead of image or text data. The invention may then utilize the data to further process the received document. The indicia data may include information such as an account data, dates, payee, payor, addresses, routing numbers, amounts, document backgrounds, or other information that may be imperative to processing that document. The system may then store the data collected from the document.

In some embodiments, the data collected from the negotiable instrument may be processed and stored as data associated with the negotiable instrument. In this way, the image of the negotiable instrument and associated indicia may be captured and the data reprocessed into text or non-image data for storage. As such, numbers, letters, or the like on the negotiable instrument may be captured as part of the document image, but be stored as text data.

In some embodiments, the system may extract the indicia data from the negotiable instrument. This data may be lifted off of the negotiable instrument and extracted as metadata. Metadata is data about the image data found on a financial document, such as a check, or the like. In some embodiments, the data may be structural metadata. As such, the data may be about the design and specification of the structure of the data. In other embodiments, the data may be descriptive metadata. As such, the data may be data describing in detail the content of the financial record or document. In some embodiments, the metadata as described herein may take the form of structural, descriptive and/or a combination thereof.

In order to extract the metadata from the indicia associated with the negotiable instrument optical character recognition may be utilized. In this way, optical character recognition may be used to extract the metadata from negotiable instruments, such as text documents and financial record images, such as checks or other financial instruments.

Specifically, in some embodiments the extracted data is utilized to allow for automated decisions for exception processing to systematically resolve exceptions. In some embodiments, the exception processing to resolve exceptions is done manually by an individual user or resource. The exceptions may include one or more irregularities such as bad micro line reads, outdated check stock, or misrepresentative checks that may result in a failure to match the check to an associated account for processing. As such, once an exception is identified during the processing the indicia lifted from the negotiable instrument with the exception may be utilized to search financial records at the financial institution to attempt to identify the correct version of the negotiable instrument. Subsequently, the system may correct the irregularity systematically and automatically.

In yet other embodiments, the data may be used for automated decisions for detecting and/or eliminating duplicate check processing. In some embodiments, the decisions and detecting or eliminating duplicate checks may be done manually by a user or individual resource. In this way, the system will lift data associated with a negotiable instrument received. The data may then be compared to metadata from previous financial documents received. If there exists an exact match between the two sets of metadata the invention will notify the user and identify the duplicate financial document. Furthermore, the system will eliminate the duplicate if necessary.

In some embodiments, the automated decisions for exception processing to systematically resolve exceptions and the automated decisions for detecting or eliminating duplicate checks may further include a confidence rating that the automated decisioning accuracy. In some embodiments, users or individual resources are utilized as a check of the automatic system to confirm the accuracy.

In some embodiments, the automated decisions for exception processing to systematically resolve exceptions and the automated decisions for detecting or eliminating duplicate checks may further include the use of historical data to resolve exceptions in payment instrument processing. As such, the invention may utilize one or more known indicia to retrieve historical data associated with the known indicia. The known indicia may include an account number, information about a payor, information about a payee, or the like. Utilizing the historical data associated with the known indicia the system may pull all historic negotiable instruments received with those known indicia. Using these historic negotiable instruments, the system may be able to identify trends, patterns, previous payors/payees, dates, or the like that may provide a confidence level to aid in the identification of the unresolved indicia.

In this way, for example, a MICR may not be resolvable on a payment instrument. The system may utilize historical data, such as an amount, payee, and date of cycle payments made by the payee to discern the payor account associated with the payment instrument. In yet another example, the MICR, amount, and date of payment may be used to resolve the payee. The system may identify a pattern in the historical data and predict with a level of certainty that the exception fits into the pattern, and thereby discern the exception indicia.

Embodiments of the invention relate to systems, methods, and computer program products for predictive determination and resolution of a value of one or more indicia located in an electronic image associated with a negotiable instrument, where the electronic image comprises a plurality of different indicia representing data associated with the negotiable instrument, said invention comprises: receiving the electronic image associated with the negotiable instrument, along with: data representing one or more resolved indicia that has been discerned with a selected level of confidence from the electronic image, wherein the one or more resolved indicia is at least one of: (1) data related to a payor, (2) date related to a payor account, or (3) dated related to a payee; and an indicator indicating one or more unresolved indicia in the electronic image associated with the negotiable instrument that has not been resolved to a level of confidence; receiving historical transaction data using the one or more resolved indicia; determining a value for the one or more unresolved indicia in the image based on the historical transaction data; and electronically storing the value determined for the one or more unresolved indicia with data for the image, such that the value may be used to process the negotiable instrument in a payment reconciliation process.

In some embodiments, the unresolved indicia is a payment amount for the negotiable instrument and the data representing the resolved indicia is data related to the payee, wherein the historical transaction data is batch data representing a plurality of payments made to the payee that are being processed in a batch, where each transaction in the batch has a payment amount and the batch comprises a total payment amount for the entire batch, and wherein said computing device determines the value of the unresolved indicia by subtracting each of the individual payment amounts for each transaction in the batch from the total payment amount for the entire batch thereby leaving a difference that represents the value of the unresolved indicia.

In some embodiments, the unresolved indicia is data identifying either the payor or the payor account, and the data representing the resolved indicia is data related to the payee, and wherein said computing device determines the value of the unresolved indicia by comparing historical transaction data associated with the payee, with data representing resolved indicia associated with the negotiable instrument. In some embodiments, the resolved indicia includes data representing an amount payable to the payee on the negotiable instrument, and wherein said computing device determines either one or both the payor or the payor account by identifying one or more payor information associated with other transaction in the historical transaction data of the payee for previous transactions of substantially the same amount as the amount payable for the negotiable instrument. In some embodiments, the resolved indicia includes data representing an amount payable to the payee on the negotiable instrument and a day of the month of the payment, and wherein said computing device determines either one or both the payor or the payor account by identifying one or more payor information associated with other transaction in the historical transaction data of the payee for previous transactions of substantially the same amount as the amount payable for the negotiable instrument and on substantially the same day of the month as the day of the month for the negotiable instrument.

In some embodiments, the resolved indicia includes data representing the payor and an amount of the payment, and wherein said computing device determines either one or both the payee or the payee account by identifying one or more payee information associated with other transaction in the historical transaction data of the payor for previous transactions of substantially the same amount as the amount payable for the negotiable instrument.

In some embodiments, the resolved indicia includes data representing the payor and a day of the month of the payment, and wherein said computing device determines either one or both the payee or the payee account by identifying one or more payee information associated with other transaction in the historical transaction data of the payor for previous transactions of substantially the day of the month as the day of the month for the negotiable instrument.

In some embodiments, cause said at least one electronic computing device to present the value determined for the one or more unresolved indicia to a user via an electronic interface; electronically receive an indication from the user that the value determined for the one or more unresolved indicia is correct; and electronically store the value determined for the one or more unresolved indicia with data for the image, such that the value may be used to process the negotiable instrument in a payment reconciliation process.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
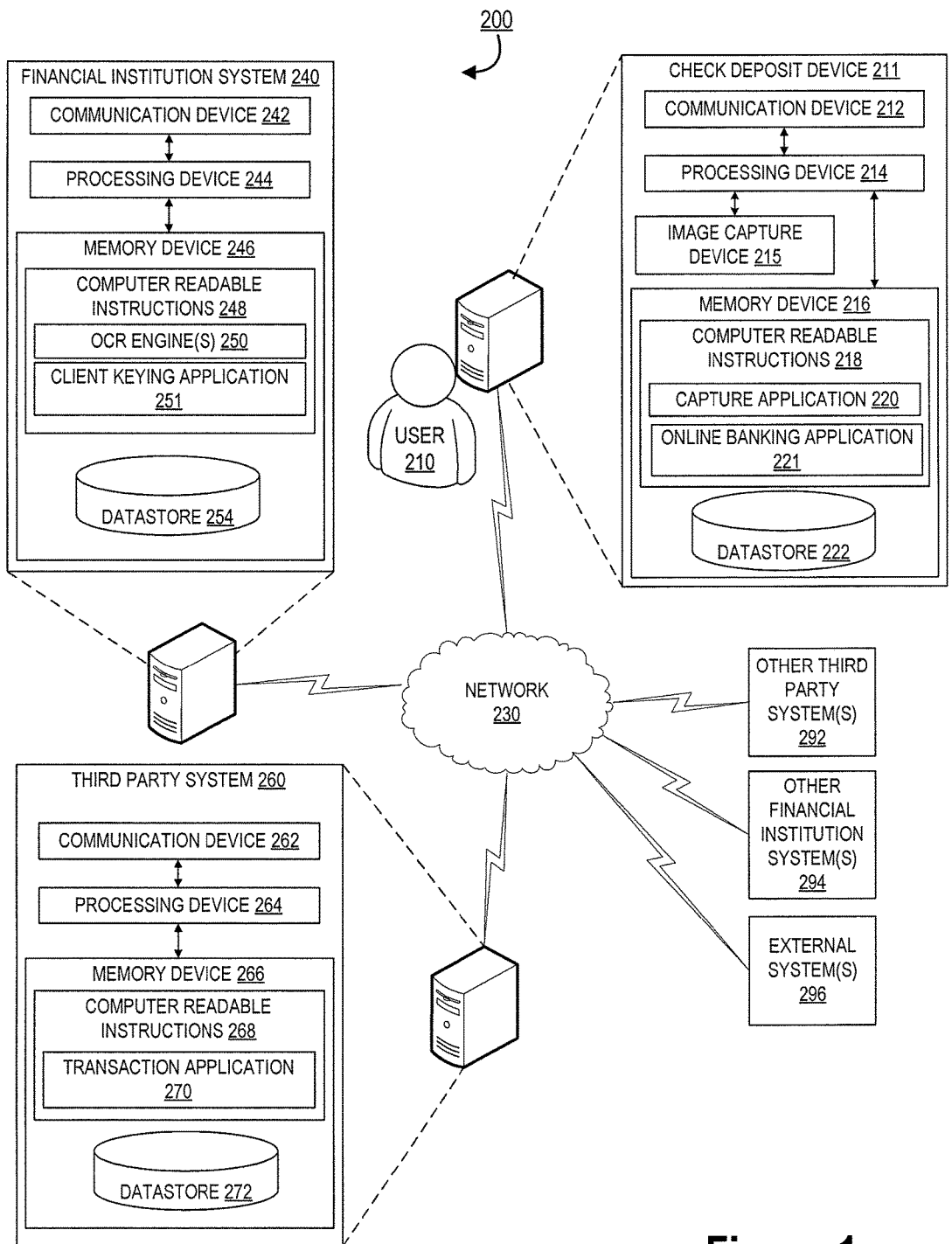
Figure 2A:
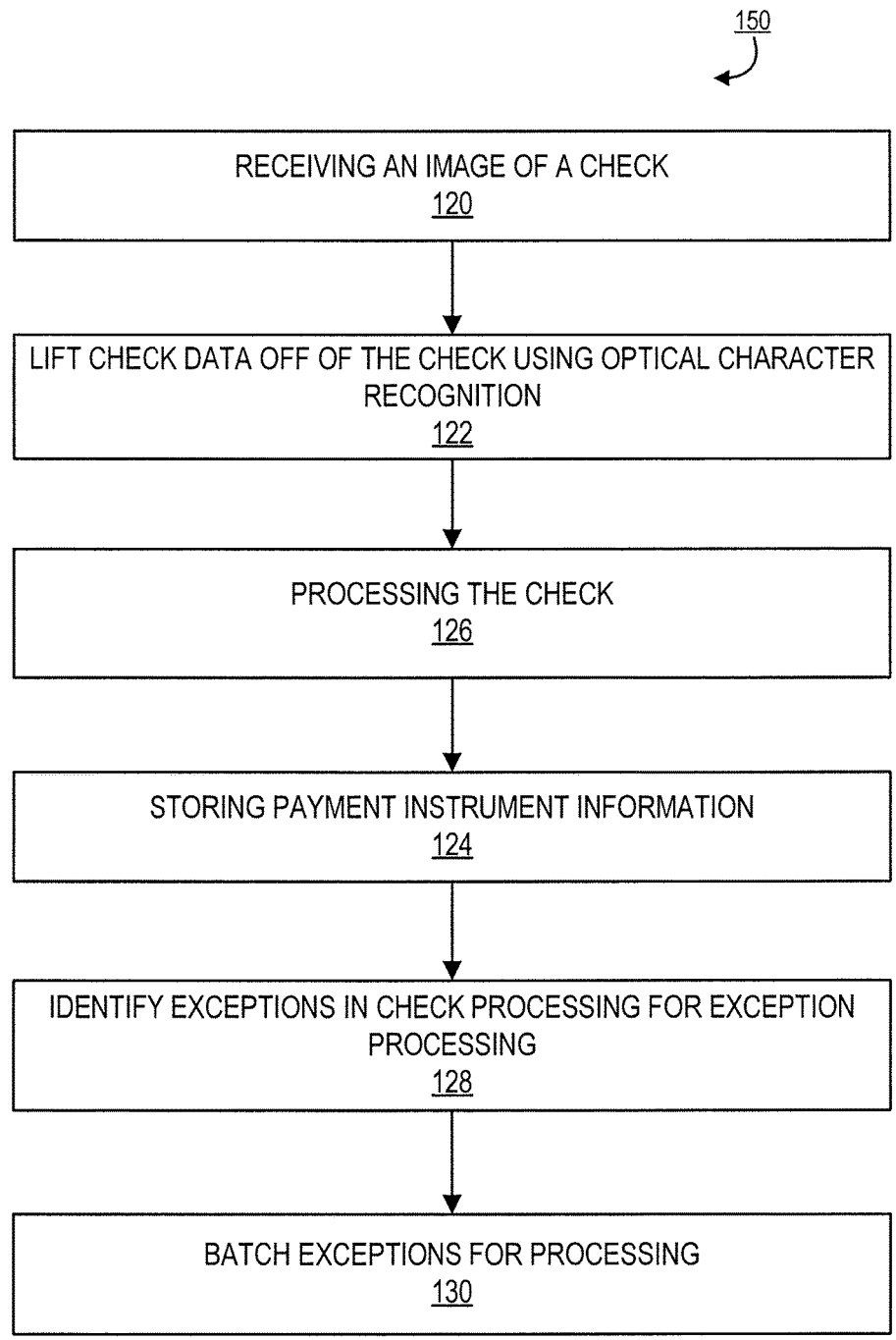
Figure 2B:
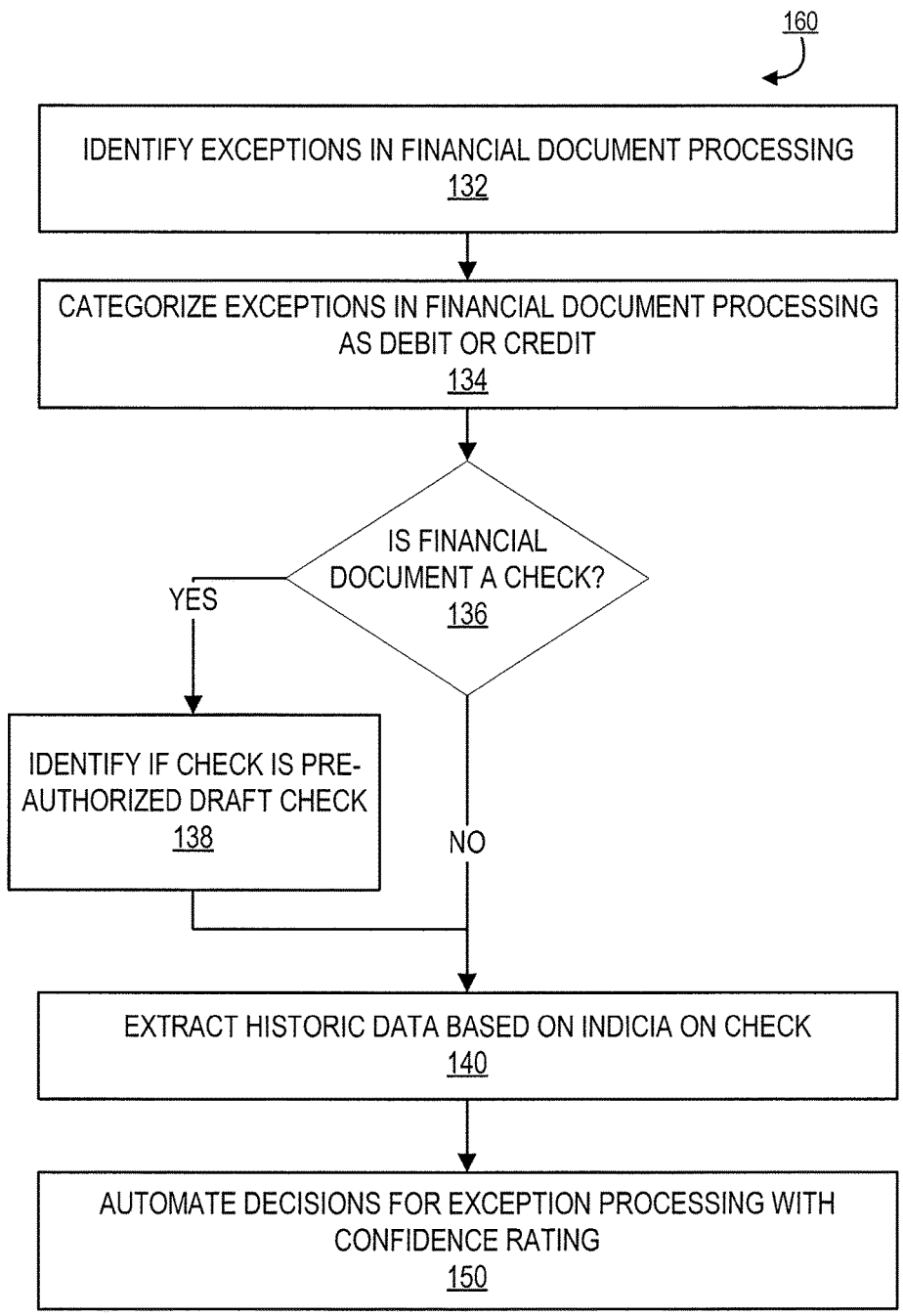
Figure 3:
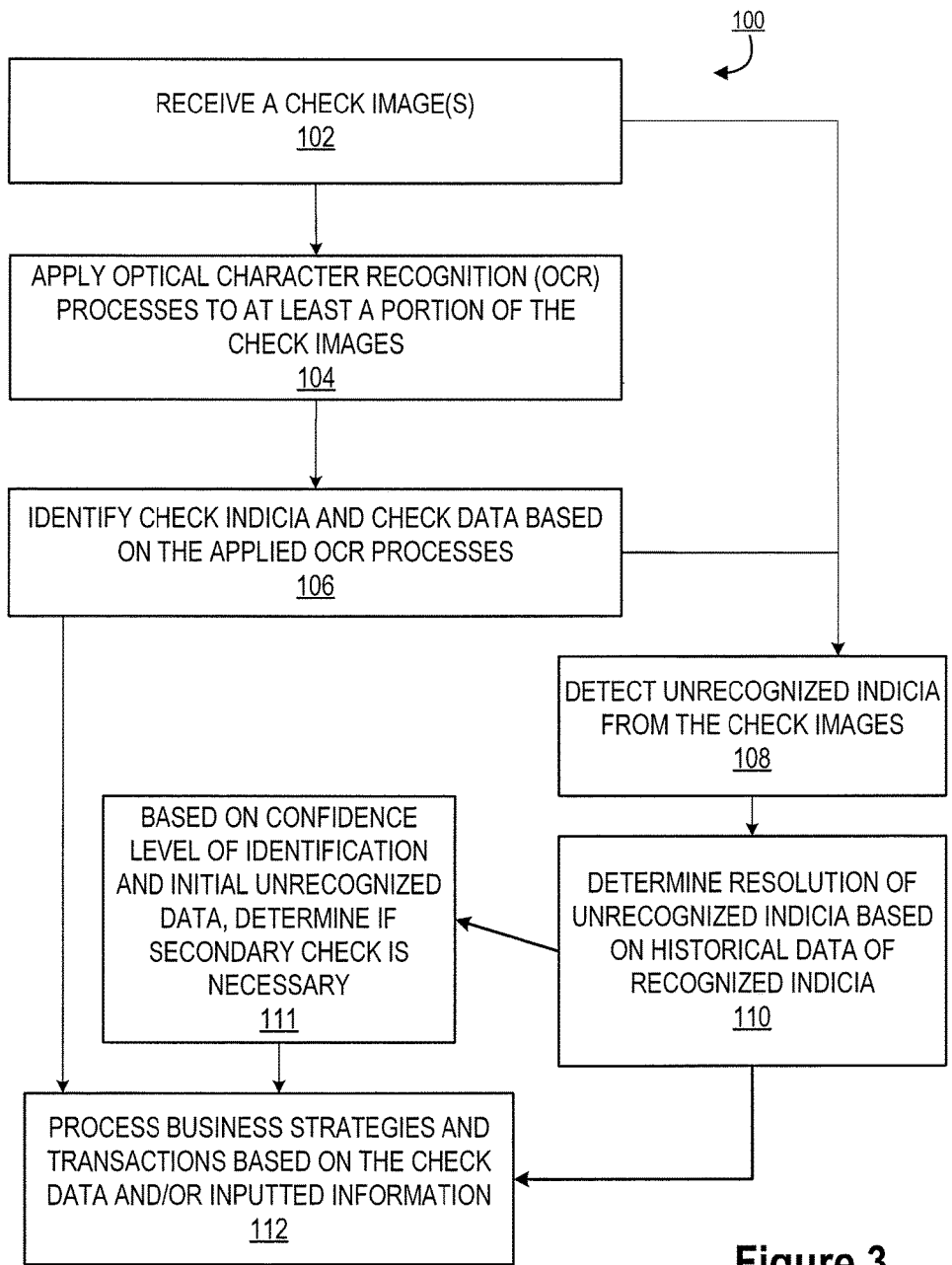
Figure 4:
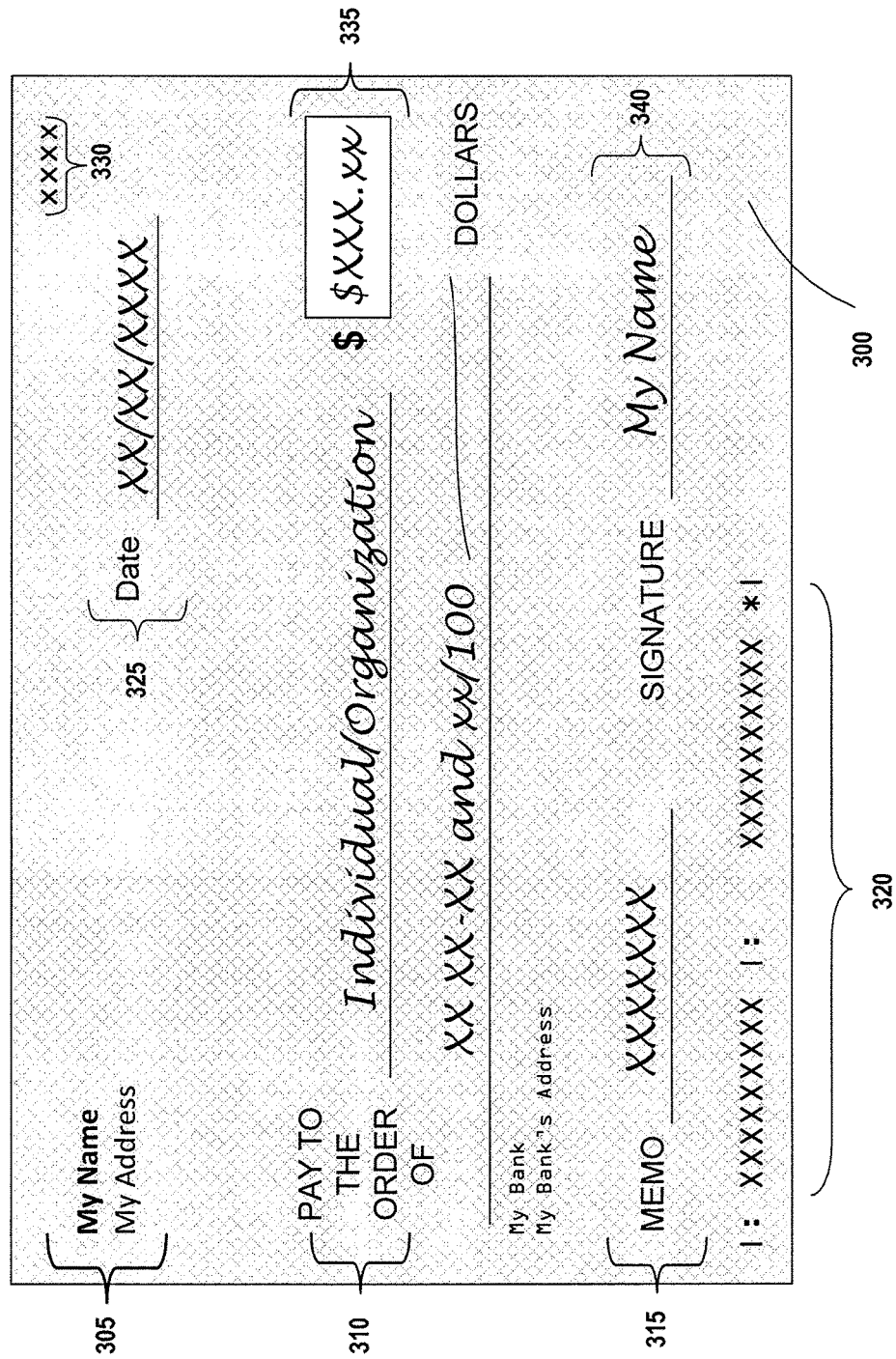
Figure 5:
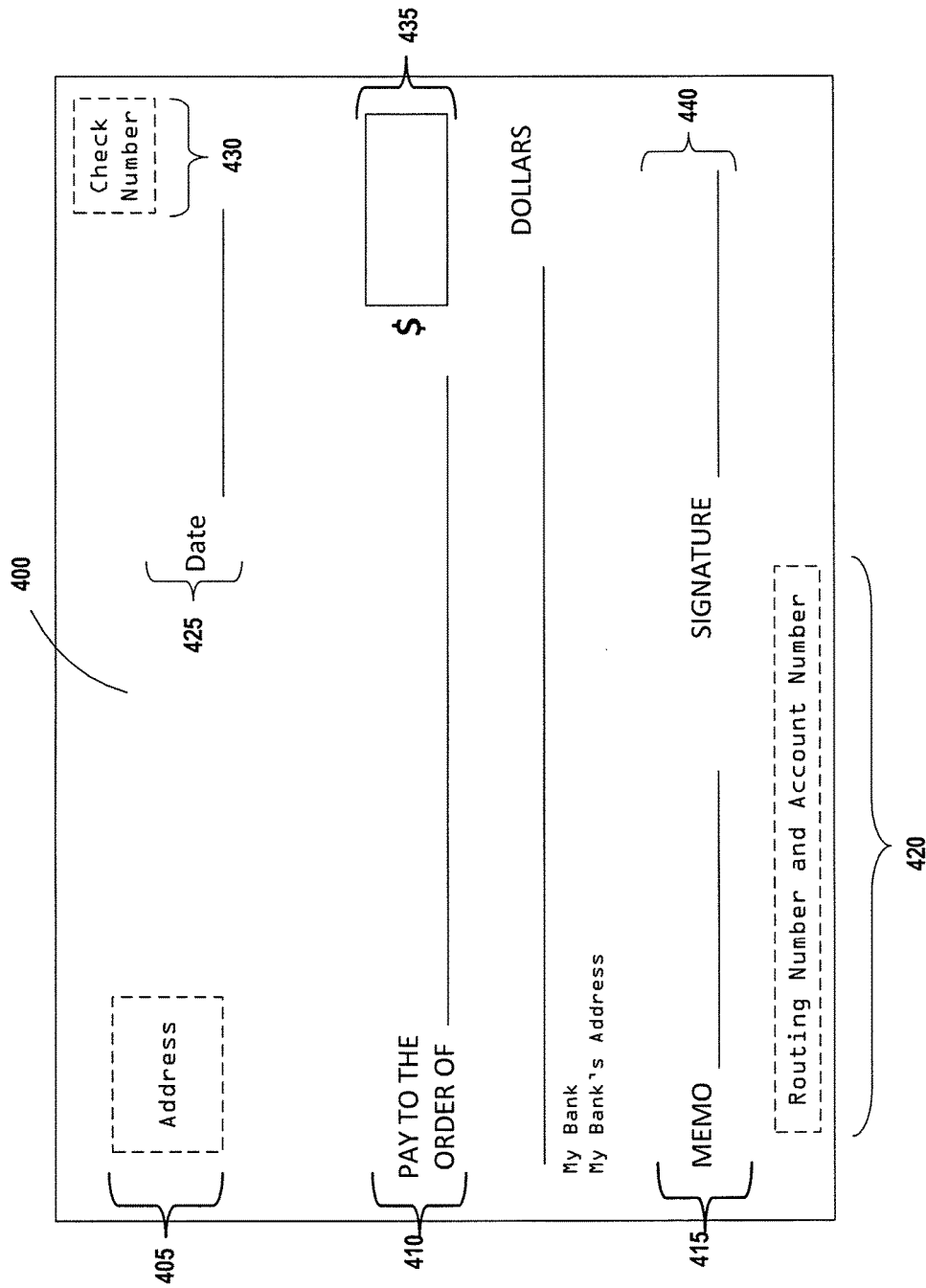
Figure 6:
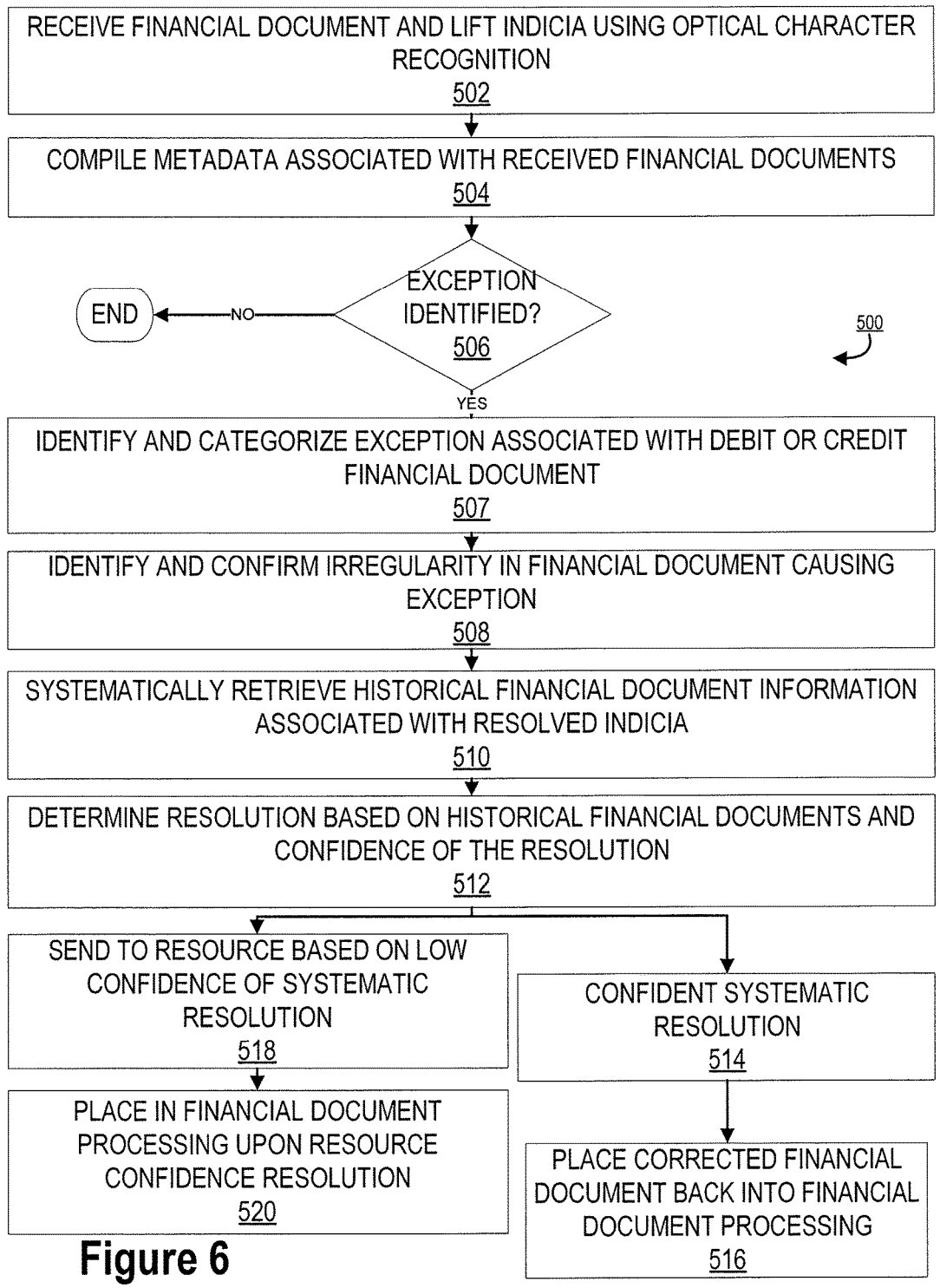
Figure 7:
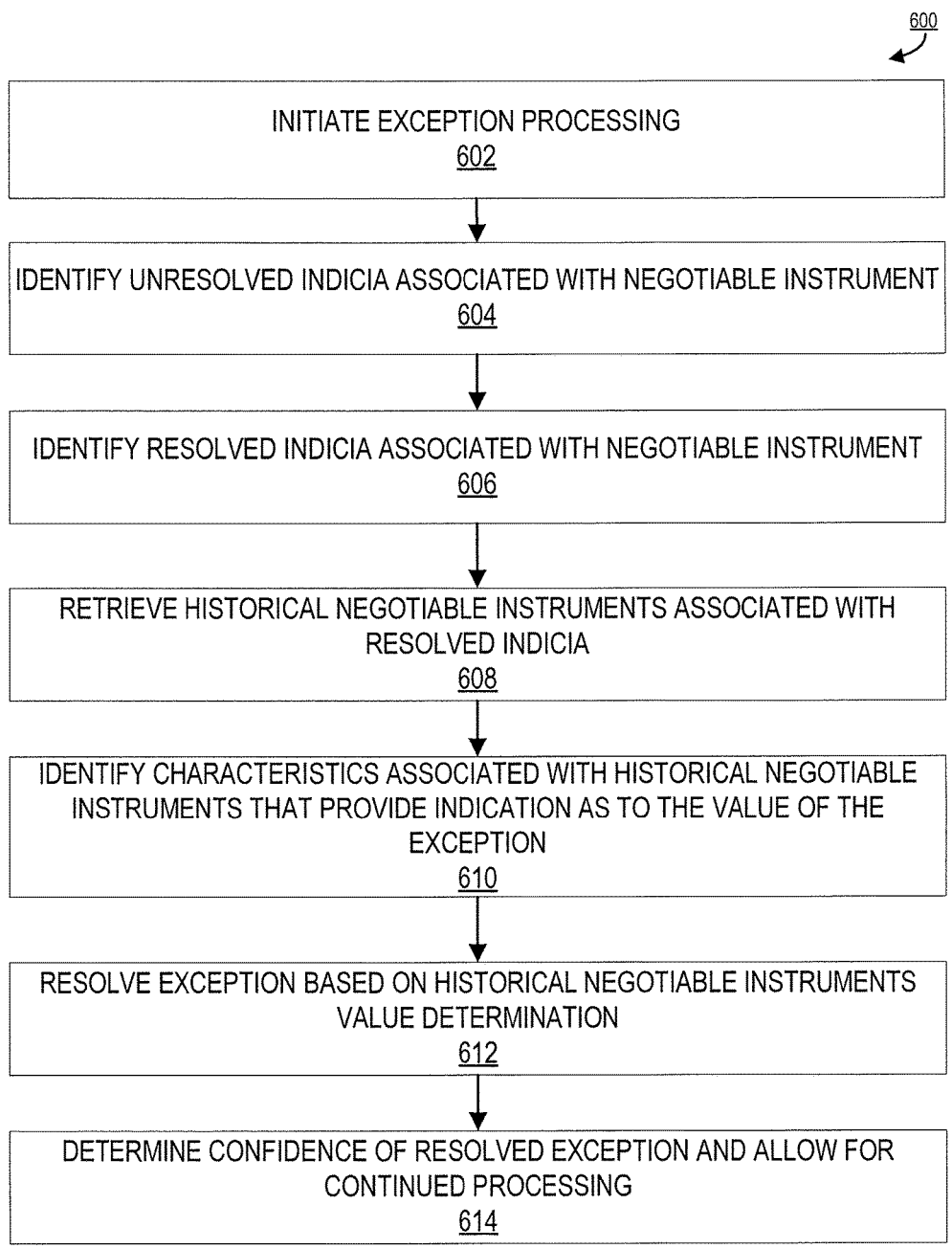

Having thus described embodiments of the invention in general terms, reference will now be made to the accompanying drawings, wherein:

FIG. 1 provides a predictive determination and resolution system environment, in accordance with one embodiment of the present invention;

FIG. 2A provides a high level process flow illustrating document exception identification and processing, in accordance with one embodiment of the present invention;

FIG. 2B provides a high level process flow illustrating general data lifting for document exception processing, in accordance with one embodiment of the present invention;

FIG. 3 provides a high level process flow illustrating identifying and extracting indicia and data from payment instruments, in accordance with one embodiment of the present invention;

FIG. 4 illustrates an exemplary image of a financial record, in accordance with one embodiment of the present invention;

FIG. 5 provides an exemplary template of a financial record, in accordance with one embodiment of the present invention;

FIG. 6 provides a process flow illustrating exception processing, in accordance with one embodiment of the present invention; and FIG. 7 provides a process flow illustrating predictive determination and resolution of electronic negotiable instruments, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. As used herein, a "document," "negotiable instrument," "financial document," "financial record," or "payment instrument" may also refer to a myriad of negotiable instrument documents, including but not limited to a lease document, a mortgage document, a deposit slip, a payment coupon, a receipt, general ledger tickets, or the like. In some embodiments, "document", "financial record", or "negotiable instrument" may exist as a physical item printed on paper or other medium. In other embodiments, the check may exist electronically. Furthermore, "document," "financial document," "financial record," "payment instrument," or "negotiable instrument" may also refer to records associated with government data, legal data, identification data, and the like. Although the disclosure is directed to financial records, it will be understood that non-financial records such as social communications, advertising, blogs, opinion writing, and the like may also be applicable to the disclosure presented herein. In cases were non-financial records are use, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety of formats including, paper records, electronic or digital records, video records, audio records, and/or combinations thereof. In some embodiments, the "document," "financial record," or "negotiable instrument" may be referred to in examples as a check or the like. Furthermore, the term "image lift data" or "data lift" may refer to the process of lifting one or more areas/elements of a document and storing those areas as metadata without storing the entire document as an image file.

Some portions of this disclosure are written in terms of a financial institution's unique position with respect document processing and retrieving. As such, a financial institution may be able to utilize its unique position to receive, store, process, and retrieve images of documents, such as those of a financial nature.

As presented herein, embodiments that detect and extract specific data from images and that analyze, process, and distribute extracted metadata are provided.

FIG. 1 illustrates a predictive determination and resolution system environment 200, in accordance with some embodiments of the invention. The environment 200 includes a check deposit device 211 associated or used with authorization of a user 210 (e.g., an account holder, a mobile application user, an image owner, a bank customer, and the like), a third party system 260, and a financial institution system 240. In some embodiments, the third party system 260 corresponds to a third party financial institution. The environment 200 further includes one or more third party systems 292 (e.g., a partner, agent, or contractor associated with a financial institution), one or more other financial institution systems 294 (e.g., a credit bureau, third party banks, and so forth), and one or more external systems 296.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The check deposit device 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a check data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-toanalog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The check deposit device 211 includes a communication device 212 and an image capture device 215 (e.g., a camera) communicably coupled with a processing device 214, which is also communicably coupled with a memory device 216. The processing device 214 is configured to control the communication device 212 such that the check deposit device 211 communicates across the network 230 with one or more other systems. The processing device 214 is also configured to access the memory device 216 in order to read the computer readable instructions 218, which in some embodiments includes a capture application 220 and an online banking application 221. The memory device 216 also includes a datastore 222 or database for storing pieces of data that can be accessed by the processing device 214. The check deposit device 211 may be a mobile device of the user 210, a bank teller device, a third party device, an automated teller machine, a video teller machine, or another device capable of capturing a check image.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 272 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR.

In some embodiments, the capture application 220, the online banking application 221, and the transaction application 270 interact with the OCR engines 250 to utilize the extracted metadata to determine decisions for exception processing. In this way, the system may systematically resolve exceptions. The exceptions may include one or more irregularities such as bad micro line reads, outdated check stock, or misrepresentative checks that may result in a failure to match the check to an associated account for processing. As such, the system may identify the exception and code it for exception processing. Furthermore, the system may utilize the metadata to match the check to a particular account automatically.

In some embodiments, the capture application 220, the online banking application 221, and the transaction application 270 interact with the OCR engines 250 to utilize the extracted metadata for automated payment stops when detecting a suspect document or time during processing. In this way, the system may identify suspect items within the extracted metadata. The document or check processing may be stopped because of this identification. In some embodiments, the suspect items may be detected utilizing OCR based on data received from a customer external to the document in comparison to the document. In some embodiments, the suspect items may be detected utilizing OCR based on data associated with the account in comparison to the document.

In some embodiments, the capture application 220, the online banking application 221, and the transaction application 270 interact with the OCR engines 250 to utilize the extracted metadata for automated decisions for detecting and/or eliminating duplicate check processing. Duplicate checks may be detected and/or eliminated based on metadata matching. In this way, data may be lifted off of a document as metadata and compare the data to other documents utilizing the metadata form. As such, the system does not have to overlay images in order to detect duplicate documents.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the check deposit device 211. For example, in some embodiments, the application 220 is stored and configured for being accessed by a processing device of one or more third party systems 292 connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the check deposit device 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Referring now to FIG. 2A, FIG. 2A presents provides a high level process flow illustrating document exception identification and processing 150, in accordance with some embodiments of the invention. As illustrated in block 120, the method comprises receiving an image of a check or other negotiable instrument. The image received may be one or more of a check, other document, payment instrument, and/or financial record. In some embodiments, the image of the check may be received by a specialized apparatus associated with the financial institution (e.g. a computer system) via a communicable link to a user's mobile device, a camera, an Automated Teller Machine (ATM) at one of the entity's facilities, a second apparatus at a teller's station, another financial institution, or the like. In other embodiments, the apparatus may be specially configured to capture the image of the check for storage and exception processing.

As illustrated in block 122, the system may then lift indicia in the form of data off of the check using optical character recognition (OCR). The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

After the successful retrieval or capture of the image of the check, the apparatus may process the check as illustrated in block 126. The apparatus may capture individual pieces of check information from the image of the check as indicia and in metadata form. In some embodiments, the check information may be text. In other embodiments, the check information may be an image processed into a compatible data format.

As illustrated in block 124, the method comprises storing check information. After the image of the check is processed, the apparatus may store the lifted and collected check information in a compatible data format. In some embodiments, the check information may be stored as metadata. As such, individual elements of the check information may be stored separately, and may be associated with each other via metadata. In some embodiments, the individual pieces of check information may be stored together.

In some embodiments, the apparatus may additionally store the original image of the check immediately after the image of the check is received.

As illustrated in block 128, the process 150 continues by identifying exceptions in the document processing. Exceptions may be one or more irregularities in indicia of the check such as bad micro line reads, outdated document stock, misrepresented items, or the like that result in a failure to match the document to an account. In some embodiments, the process may also detect duplicate documents. In yet other embodiments, the system may identify payment stops for specific documents.

Next, as illustrated in block 130, the process 150 continues to batch exceptions for processing and quieting them for resource review. In some embodiments, the system may first provide automated decisions for exception processing utilizing the lifted data via the utilization of historical data. In this way, the system may utilize the data lifted from the document in order to rectify the exception identified in block 128. The system may retrieve historic data associated with the indicia on the check that has been determined to be correct. As such, historic data may include one or more checks from the same account, for the same amount, same payee, same payor, same stock, or the like. Once the historical data that matches the correct portions of the check, the system may identify patterns or a relationship between the current exception and the historical data. The system may identify one or more potential matches for the exception. The matches may be systematically applied to the exception, along with a confidence score for that match. In this way, the system may be able to rectify the exception without having to have an individual manually override the exception and identify the account associated with the document with the exception. In some embodiments, a confidence of the automated decisions for exception processing may be generated. Upon a low confidence or that below a threshold such as 100%, 95%, or 90%, the system may queue the exception to a work flow node for payment instrument processing by a resource. The queue of the resource may be determined based on dynamic resource management described below.

Referring now to FIG. 2B, FIG. 2B presents provides a high level process flow illustrating general data lifting for document exception processing 160, in accordance with some embodiments of the invention. As illustrated in block 132, the process 160 starts by identifying the exceptions in financial document or payment instrument processing. Once identified, the documents associated with each of the one or more exceptions may be categorized as either debit or credit documents, as illustrated in block 134. In this way, the system may identify an exception and identify the type of document that the exception was identified from.

Next, as illustrate in decision block 136, the system may identify if the document is a check or if it is another financial document or payment instrument for processing. If the financial document is a check in decision block 136, the system will identify if the check is a pre-authorized draft check, as illustrated in block 138. In some embodiments, pre-authorized draft checks are made via online purchases that ask a user for his/her check number and routing number. The pre-authorized draft check is subsequently converted to paper form and submitted to the financial institution for processing. These pre-authorized draft checks may undergo a higher level of processing scrutiny to ensure authenticity, if necessary.

Next, as illustrated in block 140, historic data based on indicia on the check is extracted. In this way, the data that is not noted as an exception is utilized to match to extracted historic data that has the same indicia as the non-exception indicia of the current document. As such, the system may retrieve historic financial documents that include one or more of the same payee, payor, amount, account number, routing numbers, addresses, or the like.

As illustrated in block 150, based on the extracted historical data, the system may be able to determine a pattern, similarity, or the like between a historical indicia and the current exception. If a match is made between a historical indicia and the current exception, the system may insert the match for processing. These automated decisions are created for the financial documents with exceptions based on lifted data and the type of exception identified. Once automated decisions are made, the system identifies a confidence of the automated decision.

In some embodiments, the system may send the exceptions for processing to a work flow node for exception processing by a resource when the confidence of that automated decision is below a threshold. In yet other embodiments, the system may allow for continued processing without resource review based on a higher confidence rating of that decision.

Referring now to FIG. 3, FIG. 3 provides a high level process flow illustrating identifying and extracting data from payment instruments 100, in accordance with some embodiments in the invention. One or more devices, such as the one or more systems and/or one or more computing devices and/or servers of FIG. 3 can be configured to perform one or more steps of the process 100 or other processes described below. In some embodiments, the one or more devices performing the steps are associated with a financial institution. In other embodiments, the one or more devices performing the steps are associated with a merchant, business, partner, third party, credit agency, account holder, and/or user.

As illustrated at block 102, one or more check images are received. The check images comprise the front portion of a check, the back portion of a check, or any other portions of a check. In cases where there are several checks piled into a stack, the multiple check images may include, for example, at least a portion of each of the four sides of the check stack. In this way, any text, numbers, or other data provided on any side of the check stack may also be used in implementing the process 100. In some embodiments the system may receive financial documents, payment instruments, checks, or the likes.

In some embodiments, each of the check images comprises indicia that includes financial record data. The financial record data includes dates financial records are issued, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like.

Although check images are illustrated in FIG. 4 and FIG. 5, it will be understood that any type of financial record image may be received. Exemplary check images include PDF files, scanned documents, digital photographs, and the like. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, agents of account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system of process 100.

In some exemplary embodiments, a customer or other entity takes a picture of a check at a point of sales or an automated teller machine (ATM) and communicates the resulting check image to a point of sales device or ATM via wireless technologies, near field communication (NFC), radio frequency identification (RFID), and other technologies. In other examples, the customer uploads or otherwise sends the check image to the system of process 100 via email, short messaging service (SMS) text, a web portal, online account, mobile applications, and the like. For example, the customer may upload a check image to deposit funds into an account or pay a bill via a mobile banking application using a capture device. The capture device can include any type or number of devices for capturing images or converting a check to any type of electronic format such as a camera, personal computer, laptop, notebook, scanner, mobile device, and/or other device.

As illustrated at block 104, optical character recognition (OCR) processes are applied to at least a portion of the check images. At least one OCR process may be applied to each of the check images or some of the check images. The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

As illustrated in block 106, the check indicia and corresponding data may be identified based on the applied OCR processing. In some embodiments, the OCR process includes location fields for determining the position of data on the check image. Based on the position of the data, the system can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the system for determining approximate location.

In other embodiments, the system executing process flow 100 defines the location fields by separating the portions and/or elements of the image of the check into quadrants. As referred to herein, the term quadrant is used broadly to describe the process of differentiating elements of a check image by separating portions and/or elements of the image of the check into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the check using a plurality of quadrants. In such an embodiment, the system may further analyze each quadrant using the OCR algorithms in order to determine whether each quadrant has valuable or useful information. Generally, valuable or useful information may relate to any data or information that may be used for processing and/or settlement of the check, used for identifying the check, and the like. Once the system determines the quadrants of the image of the check having valuable and/or useful information, the system can extract the identified quadrants together with the information from the image of the check for storage. The quadrants may be extracted as metadata, text, or code representing the contents of the quadrant. In some embodiments, the quadrants of the image of the check that are not identified as having valuable and/or useful information are not extracted from the image.

In additional embodiments, the system uses a grid system to identify non-data and data elements of a check image. The grid system may be similar to the quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. In some embodiments, the grid system and/or quadrant system is based on stock check templates obtained from check manufacturers or merchants.

In alternative or additional embodiments, the OCR process includes predefined fields to identify data. The predefined field includes one or more characters, words, or phrases that indicate a type of data. In such embodiments, the system of process 100 extracts all the data presented in the check image regardless of the location of the data and uses the predefined fields to aid in character recognition. For example, a predefined field containing the phrase "Pay to the order of" may be used to determine that data following the predefined field relates to payee information.

In addition to OCR processes, the system of process 100 can use other techniques such as image overlay to locate, identify, and extract data from the check images. In other embodiments, the system uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

As illustrated at block 108, unrecognized indicia from the check images is detected. In some embodiments, the unrecognized data includes characters, text, shading, or any other data not identified by the OCR processes. In such embodiments, the unrecognized data is detected following implementation of at least one of the OCR processes. In other embodiments, the unrecognized data is detected prior to application of the OCR processes. For example, the unrecognized data may be removed and separated from the check images or otherwise not subjected to the OCR processes. In one exemplary situation, the system may determine that handwritten portions of a check image should not undergo OCR processing due to the difficulty in identifying such handwritten portions. Exemplary unrecognized data includes handwritten text, blurred text, faded text, misaligned text, misspelled data, any data not recognized by the OCR processes or other data recognition techniques, and the like. In other cases, at least a portion of some or all of the check images may undergo pre-processing to enhance or correct the unrecognized data. For example, if the text of a check image is misaligned or blurry, the system may correct that portion of the check image before applying the OCR processes to increase the probability of successful text recognition in the OCR processes or other image processes.

In some embodiments the system will utilize historical data to review and resolve the unrecognized indicia. As illustrated in block 110, the system may determine resolutions of the unrecognized indicia based on the historical data associated with the recognized indicia from the check.

As illustrated at block 111, the process 100 continues by determining, based on the confidence level of the identification and the initial unrecognized data, if a secondary of the unrecognized data is necessary. As such, based on a confidence level, the system may require additional checking to confirm the accuracy of the identification of the unrecognized data from the check.

Finally, as illustrated in block 112, business strategies and transactions are processed based on at least one of the check data and the inputted information. Data extracted from the check images using the process 100 may be used to automate or enhance various processes such as remediating exception processes, replacing check images with check data in online statements, enforcing requirements regarding third party check deposits, facilitating check to automated clearing house transaction conversion, cross selling products, and so forth.

FIG. 4 provides an illustration of an exemplary image of a financial record 300, in accordance with one embodiment of the present invention. The financial record illustrated in FIG. 4 is a check. However, one will appreciate that any financial record, financial document, payment instrument, or the like may be provided.

The image of check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. A capture device may capture an image of the check 300 and transmit the image to a system of a financial institution via a network. The system may collect the check information from the image of the check 300 and store the check information in a datastore as metadata. In some embodiments, the pieces of check information may be stored in the datastore individually. In other embodiments, multiple pieces of check information may be stored in the datastore together.

FIG. 5 illustrates an exemplary template of a financial record 400, in accordance with one embodiment of the present invention. Again, the financial record illustrated in FIG. 5 is a check. However, one will appreciate that any financial record, financial document, payment instruments, or the like may be provided.

In the illustrated embodiment, the check template 400 corresponds to the entire front portion of a check, but it will be understood that the check template 400 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system may "learn" to map the key attributes of the check for faster and more accurate processing. In some embodiments, financial records are categorized by template. The check template 400 is only an exemplary template for a financial record, and other check templates or other financial record templates may be utilized to categorize checks or other financial records. The check template 400 can be used in the OCR processes, image overlay techniques, and the like.

The check template 400 comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

FIG. 6 illustrates a process flow for exception processing 500, in accordance with one embodiment of the present invention. As illustrated in block 502, the process 500 is initiated when financial documents or payment instruments, such as checks, are received. The received financial document may be in various forms, such as in an image format. Processing of the document may proceed wherein the indicia from the document may be collected and lifted from the document. This data is lifted from the document utilizing optical character recognition (OCR). The OCR processes enables the system to convert text and other symbols in the document image to metadata, which can then be used and incorporated into exception processing. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

Once the indicia is lifted from the document as illustrated in block 502, the process 500 continues to compile and store the metadata associated with the indicia of the received financial documents, as illustrated in block 504. As such, after the image of the document, such as a check, is processed, the system may compile and store the lifted and collected check information as metadata. As such, individual elements of the check information may be stored separately, together, or the like. In this way, the system stores the type of document, the appearance of the document, the information on the document, such as numbers, accounts, dates, names, addresses, payee, payor, routing numbers, amounts, document backgrounds, or the like as metadata.

In some embodiments, the stored data may be structural metadata. As such, the data may be about the design and specification of the structure of the data. In other embodiments, the data may be descriptive metadata. As such, the data may be data describing in detail the content of the financial record or document. In some embodiments, the metadata as described herein may take the form of structural, descriptive and/or a combination thereof.

Next, as illustrated in decision block 506, the system monitors the received documents to identify exceptions in the document processing. Exceptions may be one or more of irregularities such as bad micro line reads, outdated document stock, misrepresented items, or the like that result in a failure to match the document to an account intended to be associated with that document. If no exception is identified, then the process 500 terminates.

As illustrated in block 507 the process 500 continues to identify and categorize any identified exceptions into financial documents associated with debits or financial documents associated with credits. As illustrated in block 508 the process 500 continues to confirm the irregularity in the financial document that lead to the exception identification in decision block 506. The irregularity that lead to the exception may be one or more of a bad micro line read, outdated documents (such as an outdated check or deposit statement), or a general failure of the document to match an existing financial account.

Next, as illustrated in block 510, the process 500 continues by systematically retrieving historical financial document information associated with the resolved indicia of the check. As such, the system may identify and determine that some of the indicia associated with the check is not an exception and is satisfactory for processing. These indicia are considered resolved and are then utilized to find and retrieve historical financial documents that have the same or similar indicia as the resolved indicia of the current document. In this way, based on the payee, payor, account number, or the like, historical documents may be identified as matching one or more of those indicia.

Next, as illustrated in block 512, the process 500 continues by determining a resolution based on the historical financial documents and a confidence associated with the systematic resolution for exception resolution. In some embodiments, utilizing the historical documents associated with the known indicia of the current document with the exception, the system may be able to identify trends, patterns, previous payors/payees, dates, or the like between the historic document and the current document. In some embodiments, the patterns may then be utilized to match historic indicia from the historic document to the exception indicia. In this way, for example, a MICR may not be resolvable on a payment instrument. The system may utilize historical data, such as an amount, payee, and date of cycle payments made by the payee to discern the payor account associated with the payment instrument. In yet another example, the MICR, amount, and date of payment may be used to resolve the payee. The system may identify a pattern in the historical data and predict with a level of certainty that the exception fits into the pattern, and thereby discern the exception indicia.

In some embodiments, the system may determine a resolution to the exception if the exception is an amount of the check by subtracting each of the individual payment amounts for each transaction in the batch from the total payment amount for the entire batch thereby leaving a difference that represents the value of the unresolved indicia. In some embodiments, the resolved indicia may be determined when data representing an amount payable to the payee on the negotiable instrument is the exception by determining either one or both the payor or the payor account by identifying one or more payor information associated with other transaction in the historical data of the payee for previous transactions of substantially the same amount as the amount payable for the financial document.

In some embodiments, he system may determine a resolution to the exception if the exception is when data representing the payor and an amount of the payment by determining either one or both the payee or the payee account by identifying one or more payee information associated with other transaction in the historical transaction data of the payor for previous transactions of substantially the same amount as the amount payable for the financial document.

In some embodiments, the system may determine a resolution to the exception if the exception is when data representing the payor and/or a day of the month of the payment is the exception by determining either one or both the payee or the payee account by identifying one or more payee information associated with other transaction in the historical transaction data of the payor for previous transactions of substantially the day of the month as the day of the month for the financial document.

In some embodiments, the system may determine a resolution to the exception if the exception is when data representing an amount payable to the payee on the check is the exception by determining either one or both the payor or the payor account by identifying one or more payor information associated with other transaction in the historical transaction data of the payee for previous transactions of substantially the same amount as the amount payable for the financial document.

Once the exception is discerned and a resolution is identified by the system, the system may also generate and determine a confidence of the automated resolution. If the confidence is not satisfactory, such as not being above a pre-determined threshold, the system may send the exception to a resource based on the confidence score not reaching a pre-determined threshold, as illustrated in block 518. Next, as illustrated in block 520, the system may place the resolved exception into financial document processing after resolution and confirmation from the resource.

Referring back to block 512 of FIG. 6, if a confidence is generated significantly high enough to reach the pre-determined threshold, the system continues and automatically and systematically corrects the exception based on the match based on the confident systematic resolution, as illustrated in block 514. In some embodiments, there may be one or more threshold confidences related to the exception. As such, if a match has been made between the metadata and a financial account and it is above a pre-determined confidence, then the system may automatically correct the exception. However, in some embodiments, the system may request manual acceptance of the correction of the exception.

Finally, as illustrated in block 516, the corrected financial document may be placed back into the financial document processing for continued processing after the exception has been identified and corrected via systematic searching financial institution data utilizing metadata extracted from the original financial document with an exception.

FIG. 7 illustrates a process flow illustrating predictive determination and resolution of electronic negotiable instruments 600, in accordance with one embodiment of the present invention. The process 600 is initiated by initiating the exception processing of negotiable instrument or the like, as illustrated in block 602. In this way, the system may receive the electronic image associated with the negotiable instrument, along with data representing one or more resolved indicia that has been discerned with a selected level of confidence from the electronic image, wherein the one or more resolved indicia is at least one of: 1) data related to a payor, 2) date related to a payor account, or 3) dated related to a payee.

Next, as illustrated in block 604, the system identifies the unresolved indicia that is associated with the exception of the negotiable instrument. The unresolved indicia is data identifying either the payor or the payor account, and the data representing the resolved indicia is data related to the payee. As such, the system receives an indicator indicating one or more unresolved indicia in the electronic image associated with the negotiable instrument that has not been resolved to a level of confidence.

Once the specific indicia or specific part of the negotiable instrument is identified as the exception, the process may continue by identifying the resolved or non-exception portions of the negotiable instrument, as illustrated in block 606.

Next, as illustrated in block 608, the process 600 continues by retrieving historical negotiable instruments associated with the resolved indicia. The historical data is batch data representing a plurality of payments made to the payee that are being processed in a batch, where each transaction in the batch has a payment amount and the batch comprises a total payment amount for the entire batch.

As illustrated in block 610, the process 600 continues by identifying characteristics associated with historical negotiable instruments that provide an indication as the value of the exception. As such, the system may determine a value for the one or more unresolved indicia in the image based on the historical transaction data. The value of the unresolved indicia may be determined by comparing historical transaction data associated with the payee, with data representing resolved indicia associated with the negotiable instrument.

As illustrated in block 612, the system may resolve the exceptions based on the historical negotiable instruments and the value determination therefrom. In some embodiments, the system may determine the value of the unresolved indicia by subtracting each of the individual payment amounts for each transaction in the batch from the total payment amount for the entire batch thereby leaving a difference that represents the value of the unresolved indicia.

In some embodiments, the resolved indicia may be determined when data representing an amount payable to the payee on the negotiable instrument is the exception by determining either one or both the payor or the payor account by identifying one or more payor information associated with other transaction in the historical data of the payee for previous transactions of substantially the same amount as the amount payable for the negotiable instrument.

In other embodiments, the resolved indicia may be identified when data representing the payor and an amount of the payment is the exception by determining either one or both the payee or the payee account by identifying one or more payee information associated with other transaction in the historical transaction data of the payor for previous transactions of substantially the same amount as the amount payable for the negotiable instrument.

In yet other embodiments, the resolved indicia may be determined when data representing the payor and a day of the month of the payment is the exception by determining either one or both the payee or the payee account by identifying one or more payee information associated with other transaction in the historical transaction data of the payor for previous transactions of substantially the day of the month as the day of the month for the negotiable instrument.

In yet other embodiments, the resolved indicia may be identified when data representing an amount payable to the payee on the negotiable instrument is the exception by determining either one or both the payor or the payor account by identifying one or more payor information associated with other transaction in the historical transaction data of the payee for previous transactions of substantially the same amount as the amount payable for the negotiable instrument.

Upon determination of the value of the exception and presenting a resolved indicia, the process 600 may continue by determining a confidence level of the resolved exception and allowing for continued processing if the confidence level is sufficient. Furthermore, the system may electronically store the value determined for the one or more unresolved indicia with data for the image, such that the value may be used to process the negotiable instrument in a payment reconciliation process.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| Docket Number | U.S. patent application Ser. No. | Title | Filed On |
|---|---|---|---|
| 6573US1.014033.2457 | 14/750,408 | ELEMENT LEVEL PRESENTATION OF ELEMENTS OF A PAYMENT INSTRUMENT FOR EXCEPTIONS PROCESSING | Concurrently Herewith |
| 6574US1.014033.2458 | 14/750,419 | ELEMENT LEVEL CONFIDENCE SCORING OF ELEMENTS OF A PAYMENT INSTRUMENT FOR EXCPETIONS PROCESSING | Concurrently Herewith |
| 6575US1.014033.2459 | 14/750,666 | ENSURING BATCH INTEGRITY IN A PAYMENT INSTRUMENT EXCEPTIONS PROCESSING SYSTEM | Concurrently Herewith |
| 6587US1.014033.2460 | 14/750,684 | MONITORING MODULE USAGE IN A DATA PROCESSING SYSTEM | Concurrently Herewith |
| 6629US1.014033.2461 | 14/750,380 | DYNAMIC RESOURCE MANAGEMENT ASSOCIATED WITH PAYMENT INSTRUMENT EXCEPTIONS PROCESSING | Concurrently Herewith |

What is claimed is:

1. A system for predictive determination and resolution of a value of one or more indicia located in an electronic image associated with a negotiable instrument, where the electronic image comprises a plurality of different indicia representing data associated with the negotiable instrument, said system comprising:
at least one electronic storage device; and
computer program instruction code stored in said electronic storage device, wherein said computer program instruction code is structured to cause said at least one electronic computing device to:
receive the negotiable instrument;
lift indicia from the negotiable instrument via optical character recognition, wherein the indicia is stored as metadata describing design, specification, and structure of the indicia;
identify within the indicia of the electronic image associated with the negotiable instrument an indicator associated within an indicia indicating one or more unresolved indicia in the electronic image that is not resolved;
discern data representing one or more resolved indicia from the electronic image, by identifying, from the metadata associated with the indicia, when the one or more resolved indicia comprises: 1) data related to a payor, 2) date related to a payor account, or 3) dated related to a payee;
retrieve, systematically, historical transaction data matching the one or more resolved indicia;
identify one or more patterns between the historical transaction data and the one or more unresolved indicia and determine a resolution for the one or more unresolved indicia;
determine and store a value for the one or more unresolved indicia for presentation via user device for payment reconciliation processing;
cause the at least one electronic computing device to present the value determined for the one or more unresolved indicia to a user via an electronic interface;
receive confirmation from the user that the value determined for the one or more unresolved indicia is correct; and
store, electronically, the value determined for the one or more unresolved indicia with data for the image, such that the value may be used to process the negotiable instrument in a payment reconciliation process.

2. A system according to claim 1,
wherein the unresolved indicia is a payment amount for the negotiable instrument and the data representing the resolved indicia is data related to the payee,
wherein the historical transaction data is batch data representing a plurality of payments made to the payee that are being processed in a batch, where each transaction in the batch has a payment amount and the batch comprises a total payment amount for the entire batch, and
wherein said computing device further determines a value of the unresolved indicia by subtracting each of the individual payment amounts for each transaction in the batch from the total payment amount for the entire batch thereby leaving a difference that represents the value of the unresolved indicia.

3. A system according to claim 1, wherein the unresolved indicia is data identifying either the payor or the payor account, and the data representing the resolved indicia is data related to the payee, and wherein said computing device determines the value of the unresolved indicia by comparing historical transaction data associated with the payee, with data representing resolved indicia associated with the negotiable instrument.

4. A system according to claim 3, wherein the resolved indicia includes data representing an amount payable to the payee on the negotiable instrument, and wherein said computing device determines either one or both the payor or the payor account by identifying one or more payor information associated with other transaction in the historical transaction data of the payee for previous transactions of substantially the same amount as the amount payable for the negotiable instrument.

5. A system according to claim 3, wherein the resolved indicia includes data representing an amount payable to the payee on the negotiable instrument and a day of the month of the payment, and wherein said computing device determines either one or both the payor or the payor account by identifying one or more payor information associated with other transaction in the historical transaction data of the payee for previous transactions of substantially the same amount as the amount payable for the negotiable instrument and on substantially the same day of the month as the day of the month for the negotiable instrument.

6. A system according to claim 3, wherein the resolved indicia includes data representing the payor and an amount of the payment, and wherein said computing device determines either one or both the payee or the payee account by identifying one or more payee information associated with other transaction in the historical transaction data of the payor for previous transactions of substantially the same amount as the amount payable for the negotiable instrument.

7. A system according to claim 3, wherein the resolved indicia includes data representing the payor and a day of the month of the payment, and wherein said computing device determines either one or both the payee or the payee account by identifying one or more payee information associated with other transaction in the historical transaction data of the payor for previous transactions of substantially the day of the month as the day of the month for the negotiable instrument.

8. A computer program product located on a non-transitory computer readable medium for predictive determination and resolution of a value of one or more indicia located in an electronic image associated with a negotiable instrument, where the electronic image comprises a plurality of different indicia representing data associated with the negotiable instrument, said computer program product comprising instructions for operation by one or more computing devices processors, said instructions comprising:
 receiving the negotiable instrument;
 lifting indicia from the negotiable instrument via optical character recognition, wherein the indicia is stored as metadata describing design, specification, and structure of the indicia;
 identifying within the indicia of the electronic image associated with the negotiable instrument an indicator associated within an indicia indicating one or more unresolved indicia in the electronic image that is not resolved;
 discerning data representing one or more resolved indicia from the electronic image, by identifying, from the metadata associated with the indicia, when the one or more resolved indicia is at least one of: 1) data related to a payor, 2) date related to a payor account, or 3) dated related to a payee;
 retrieving, systematically, historical transaction data matching the one or more resolved indicia;
 identifying one or more patterns between the historical transaction data and the one or more unresolved indicia and determine a resolution for the one or more unresolved indicia;
 determining and storing a value for the one or more unresolved indicia for presentation via user device for payment reconciliation processing;
 causing the at least one electronic computing device to present the value determined for the one or more unresolved indicia to a user via an electronic interface;
 receive confirmation from the user that the value determined for the one or more unresolved indicia is correct; and
 store, electronically, the value determined for the one or more unresolved indicia with data for the image, such that the value may be used to process the negotiable instrument in a payment reconciliation process.

9. A computer program product according to claim 8, wherein the unresolved indicia is data identifying either the payor or the payor account, and the data representing the resolved indicia is data related to the payee, and wherein said a third set of instruction codes is structured to cause a computing device to further determine a value of the unresolved indicia by comparing historical transaction data associated with the payee, with data representing resolved indicia associated with the negotiable instrument.

10. A computer program product according to claim 9, wherein the resolved indicia includes data representing an amount payable to the payee on the negotiable instrument, and wherein said third set of instruction codes is structured to cause a computing device to determine either one or both the payor or the payor account by identifying one or more payor information associated with other transaction in the historical transaction data of the payee for previous transactions of substantially the same amount as the amount payable for the negotiable instrument.

11. A computer program product according to claim 9, wherein the resolved indicia includes data representing an amount payable to the payee on the negotiable instrument and a day of the month of the payment, and wherein said third set of instruction codes is structured to cause a computing device to determine either one or both the payor or the payor account by identifying one or more payor information associated with other transaction in the historical transaction data of the payee for previous transactions of substantially the same amount as the amount payable for the negotiable instrument and on substantially the same day of the month as the day of the month for the negotiable instrument.

12. A computer program product according to claim 9, wherein the resolved indicia includes data representing the payor and an amount of the payment, and wherein said third set of instruction codes is structured to cause a computing device to determine either one or both the payee or the payee account by identifying one or more payee information associated with other transaction in the historical transaction data of the payor for previous transactions of substantially the same amount as the amount payable for the negotiable instrument.

13. A computer program product according to claim 9, wherein the resolved indicia includes data representing the payor and a day of the month of the payment, and wherein said third set of instruction codes is structured to cause a computing device to determine either one or both the payee or the payee account by identifying one or more payee information associated with other transaction in the historical transaction data of the payor for previous transactions of substantially the day of the month as the day of the month for the negotiable instrument.

14. A computer implemented method for predictive determination and resolution of a value of one or more indicia located in an electronic image associated with a negotiable instrument, where the electronic image comprises a plurality of different indicia representing data associated with the negotiable instrument, said method implemented by one or more electronic computing devices and comprising:

receiving the negotiable instrument;
lifting indicia from the negotiable instrument via optical character recognition, wherein the indicia is stored as metadata describing design, specification, and structure of the indicia;
identifying within the indicia of the electronic image associated with the negotiable instrument an indicator associated within an indicia indicating one or more unresolved indicia in the electronic image that is not resolved;
discerning data representing one or more resolved indicia from the electronic image, by identifying, from the metadata associated with the indicia, when the one or more resolved indicia comprises: 1) data related to a payor, 2) date related to a payor account, or 3) dated related to a payee; retrieving, systematically, historical transaction data matching the one or more resolved indicia;
identifying one or more patterns between the historical transaction data and the one or more unresolved indicia and determine a resolution for the one or more unresolved indicia;
determining and storing a value for the one or more unresolved indicia for presentation via user device for payment reconciliation processing;
causing the at least one electronic computing device to present the value determined for the one or more unresolved indicia to a user via an electronic interface;
receive confirmation from the user that the value determined for the one or more unresolved indicia is correct; and
store, electronically, the value determined for the one or more unresolved indicia with data for the image, such that the value may be used to process the negotiable instrument in a payment reconciliation process.

15. A computer implement method according to claim 14,
wherein the unresolved indicia is a payment amount for the negotiable instrument and the data representing the resolved indicia is data related to the payee,
wherein the historical transaction data is batch data representing a plurality of payments made to the payee that are being processed in a batch, where each transaction in the batch has a payment amount and the batch comprises a total payment amount for the entire batch, and
further comprising determining a value for the one or more unresolved indicia in the image comprises determining the value of the unresolved indicia by subtracting each of the individual payment amounts for each transaction in the batch from the total payment amount for the entire batch thereby leaving a difference that represents the value of the unresolved indicia.

16. A computer implemented method according to claim 14, wherein the unresolved indicia is data identifying either the payor or the payor account, and the data representing the resolved indicia is data related to the payee, and wherein said determining a value for the one or more unresolved indicia in the image comprises determining the value of the unresolved indicia by comparing historical transaction data associated with the payee, with data representing resolved indicia associated with the negotiable instrument.

17. A computer implemented method according to claim 16, wherein the resolved indicia includes data representing an amount payable to the payee on the negotiable instrument, and wherein said determining a value for the one or more unresolved indicia in the image comprises determining either one or both the payor or the payor account by identifying one or more payor information associated with other transaction in the historical transaction data of the payee for previous transactions of substantially the same amount as the amount payable for the negotiable instrument.

18. A computer implemented method according to claim 16, wherein the resolved indicia includes data representing an amount payable to the payee on the negotiable instrument and a day of the month of the payment, and wherein said determining a value for the one or more unresolved indicia in the image comprises determining either one or both the payor or the payor account by identifying one or more payor information associated with other transaction in the historical transaction data of the payee for previous transactions of substantially the same amount as the amount payable for the negotiable instrument and on substantially the same day of the month as the day of the month for the negotiable instrument.

19. A computer implemented method according to claim 16, wherein the resolved indicia includes data representing the payor and an amount of the payment, and wherein said determining a value for the one or more unresolved indicia in the image comprises determining either one or both the payee or the payee account by identifying one or more payee information associated with other transaction in the historical transaction data of the payor for previous transactions of substantially the same amount as the amount payable for the negotiable instrument.

20. A computer implemented method according to claim 16, wherein the resolved indicia includes data representing the payor and a day of the month of the payment, and wherein said determining a value for the one or more unresolved indicia in the image comprises determining either one or both the payee or the payee account by identifying one or more payee information associated with other transaction in the historical transaction data of the payor for previous transactions of substantially the day of the month as the day of the month for the negotiable instrument.

* * * * *